United States Patent [19]

Pulles

[11] 3,862,580

[45] Jan. 28, 1975

[54] PLASTIC PAWL WITH INTEGRAL PAWL SPRING

[75] Inventor: Eduard J. Pulles, Huntsville, Ala.

[73] Assignee: GTE Automatic Electric Laboratories Incorporated, Northlake, Ill.

[22] Filed: Nov. 2, 1973

[21] Appl. No.: 412,232

[52] U.S. Cl. ............................ 74/577 S, 74/577 FS
[51] Int. Cl. .......................................... F16d 41/12
[58] Field of Search ......... 74/577 SF, 577 S, 577 R, 74/576, 578, 575

[56] References Cited
UNITED STATES PATENTS 2,216,482  10/1940  Wright ............................ 74/577 S
2,717,565  9/1955   Baehr ........................... 74/577 R X
3,225,874  12/1965  Woolley ......................... 74/576 X Primary Examiner—Samuel Scott
Assistant Examiner—F. D. Shoemaker
Attorney, Agent, or Firm—Robert J. Black

[57] ABSTRACT

A pawl for use with a ratchet wheel in which the pawl includes a hub-like section and a head section extending outwardly from the hub-like section in one direction and as energy storing tail section extending outwardly from the hub-like section in a second direction. Means are also provided to limit movement of the pawl relative to the ratchet wheel to reduce the area of surface contact between the pawl and ratchet wheel when the pawl is biased against the ratchet wheel for purpose of noise reduction.

2 Claims, 4 Drawing Figures

PLASTIC PAWL WITH INTEGRAL PAWL SPRING

BACKGROUND OF THE INVENTION

This invention relates to a combination of mechanical elements and more particularly relates to an improved pawl for use with a ratchet wheel wherein a unitary, pivotable pawl member having an energy storing tail section, serves to preclude the ratchet from rotating in one direction after it has been rotated in the opposite direction. Further, the invention is directed to obviating noise often encountered when a pawl member strikes a ratchet member.

The use of a pawl and ratchet wheel in which a pawl member is employed to preclude movement of the ratchet wheel, after it has been rotated in one direction, from rotating in the opposite direction is known, as illustrated in U.S. Pat. Nos. 2,683,376 and 3,059,500. Unfortunately, prior art pawl members have certain disadvantages. In some instances, the pawl member requires a separate spring member to bias the pawl member against the ratchet wheel to effect the desired locking action. This arrangement requires a plurality of parts which tends to increase the cost of manufacture of the unit. Additionally, the assembly operation is longer because of the need to assemble a plurality of parts. While some attempts have been made to employ a pawl member in which the spring member is integral with the pawl, e.g., U.S. Pat. Nos. 3,115,788 and 3,636,782, such pawls either require machining of the pawl shaft or the use of a double pawl element attached to a frame member. These pawls are not satisfactory in some applications.

A further problem that exists with pawl and ratchet wheel combinations presently available is the noise that occurs when, in operation, the biased pawl member strikes against a tooth of a ratchet wheel. While efforts have been made to minimize the noise problem, as exemplified in U.S. Pat. No. 3,540,306, the results are not entirely satisfactory in that separate, noise dampening members are utilized and specially placed so that the pawl member will strike the noise dampening member instead of the ratchet member.

What is desired is a pawl for use with a ratchet wheel in which the pawl member is adapted to be normally biased against the ratchet wheel without the need for a special spring member. Further, it is desired to minimize the noise which occurs upon contact of the pawl and ratchet member without the necessity for additional parts.

SUMMARY OF THE INVENTION

With the view of obviating the problems associated with the prior art, the invention disclosed and claimed herein is directed to a unitary pawl member which includes a pivotable hub-like section adapted to be disposed on a pawl shaft. A head section and a tail section each extends outwardly from the hub section. The head section, which preferably is a substantially rigid member, is adapted to contact the teeth of a ratchet wheel, while the tail section includes a spring means which serves to bias the pawl against the ratchet wheel to preclude movement of the wheel in a particular direction. The pawl can be cast or molded of plastic or other suitable material.

Moreover, the present invention is adapted to provide a clearance between the pawl member and teeth of the ratchet wheel whereby, in operation, the area of surface contact between the pawl and ratchet wheel teeth will be reduced, thereby obviating the undesired noise that often occurs in pawl-ratchet wheel applications.

DETAILED DESCRIPTION

Figure 1:
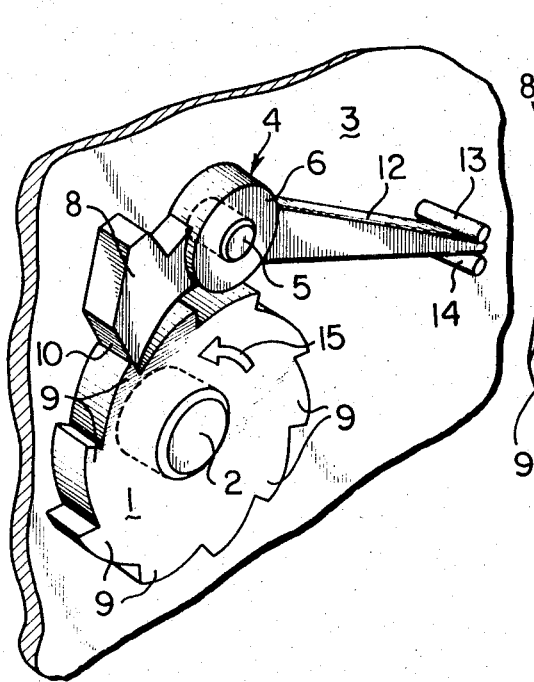
FIG. 1 shows a perspective view of one embodiment of the present invention in which the head portion of the pawl member is biased against a tooth of a ratchet wheel.
Figure 2:
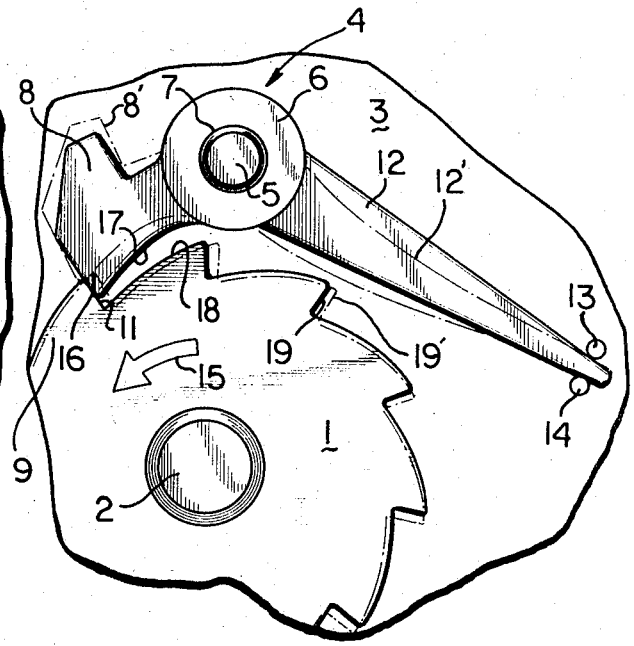
FIG. 2 shows a fragmentary, vertical view of the embodiment of FIG. 1 and more particularly the clearance between the pawl head and ratchet wheel.

Referring to the drawings and particularly FIGS. 1 and 2, ratchet wheel 1 is shown attached for rotation about ratchet shaft 2 which is attached to base plate 3. A pawl member 4 is attached to pivot pin 5 which extends out from base plate 3.

Pawl member 4 comprises a hub-like section 6 having a bore 7. Hub-section 6 is adapted to be pivotably mounted on pin 5. A first or head portion 8 which is adapted to contact the teeth 9 of ratchet wheel 1 extends outwardly from hub-section 6. Surface 10 is adapted to contact surface 11 of tooth 9.

A second or tail portion 12 extends outwardly from section 5 in a second direction. Tail-portion 12 which is tapered inwardly along its length is restricted in its movement by means of pins 13 and 14 which are fixed to plate 3.

Head-portion 8 is designed to be substantially rigid whereas tail-portion 12 is flexible and capable of being bowed in the manner shown in phantom lines 12' in FIG. 2. The flexibility of tail portion 12 can be adjusted by varying the length of the tail or varying the elasticity of the tail portion. Alternatively, the flexibility of tail-portion 12 can be adjusted by moving pins 13 and 14 along the length of tail-portion 12. Pawl 4 can be molded or cast from a plastic material; however, it is appreciated that other materials such as metal can be utilized if desired, or that a combination of materials could be employed. It is desired that head-section 8 be sufficiently rigid. Tail-section 12 should be designed to have the desired elasticity and fatigue characteristics.

FIG. 2 shows that as ratchet wheel 1 moves counterclockwise in the direction of arrow 15, wheel 1 goes from a first position shown in phantom lines 19' to a second position 19. When the wheel is in position 19', head portion 8' will be forced upwardly and will attempt to pivot pawl member 4 in a clockwise direction about pawl shaft 5; however, pins 13 and 14 preclude tail-portion 12 from rotating clockwise. Instead, tail-portion 12 is flexed and bowed as illustrated in phantom lines 12' thereby storing energy. This energy is released when head portion 8' passes apex 16 of tooth 9, at which time head-portion 8 moves back toward wheel 1 as shown in FIGS. 1 and 2 to preclude clockwise rotation of the ratchet wheel.

Pin 13 serves to limit the amount of travel of pawl member 4 in a counterclockwise direction. As shown in FIG. 2, a clearance exists between the bottom surface 17 of head-portion 8 and surface 18 on ratchet wheel 1. Eliminating or reducing the area of contact between surfaces 17 and 18 of pawl member 4 and wheel 1, so that only surface 10 contacts tooth surface 16, will serve to reduce the noise which normally occurs in an application when pawl surface 17 contacts surface 18 of wheel 1.

Figure 3:
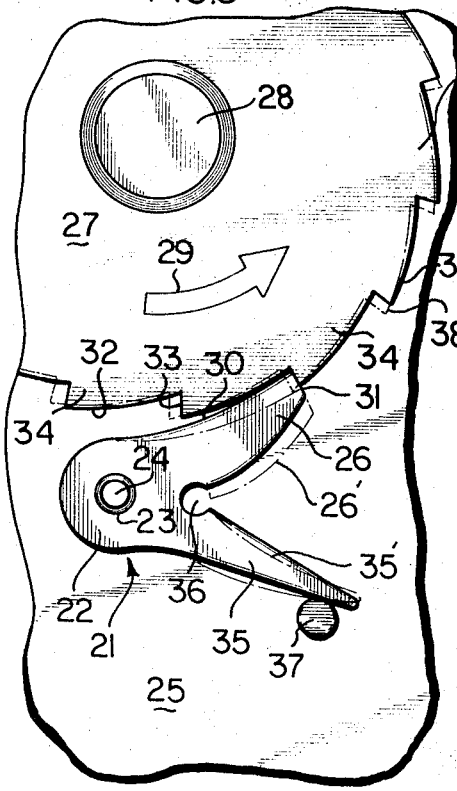
FIG. 3 shows a fragmentary, vertical view of a second embodiment of the pawl member of the present invention; and, FIG. 4 shows a fragmentary, vertical view of a third embodiment of the present invention.

FIG. 3 shows another embodiment of the present invention. In this embodiment, pawl member 21 comprises hub-section 22 which has a bore 23. Pawl 21 is pivotably mounted on pawl-shaft 24, which is fixed to base plate 25 and extends through bore 23. Head portion 26 extends outwardly from hub-section 22 and is adapted to contact ratchet wheel 27, which is adapted for rotation on shaft 28 in a counterclockwise direction as shown by arrow 29. Head-portion 26 preferably is a substantially rigid member which has surfaces 30 and 31 which are adapted to mate with corresponding surfaces 32 and 33 of each tooth 34 on wheel 25.

Tail-portion 35 also extends outwardly from hubsection 22 at an angle to portion 26. A groove or recess 36 is located at the juncture of portion 26 and 35 to permit at least tail-portion 35 to flex as shown by phantom lines 35' in FIG. 2.

Pin 37, located contiguous to the outward end of tail-portion 35, prevents clockwise rotation of pawl 21. If desired, a pin such as 13 in FIG. 2, can be provided to limit the movement of pawl member 21 in a conterclockwise direction, thereby maintaining a clearance between pawl surface 30 and surface 32 of wheel 27 in the embodiment of FIG. 3.

In operation, when wheel 27 rotates in the direction shown by arrow 29, pawl member 21 seeks to pivot in a clockwise direction about ratchet wheel shaft 28. Movement of pawl member 21 is precluded by pin 37. As seen in FIG. 3, tail-portion 35 will become bowed as illustrated in phantom lines 35' while head portion 26 moves to the position shown in phantom lines 26', thereby closing the groove 36. After wheel 27 has moved from 38' to 38, pawl member 21 will move back to its normal position wherein it precludes movement of the wheel in a clockwise direction.

Figure 4:
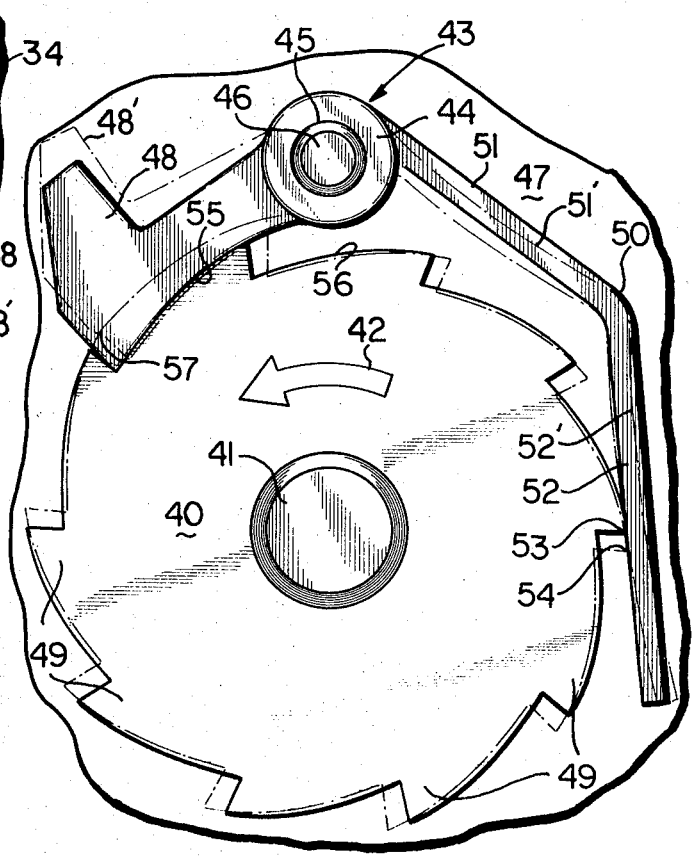

Another embodiment of the invention is shown in FIG. 4 where ratchet wheel 40 is mounted on shaft 41 to rotate in a counterclockwise direction shown by the arrow 42. Pawl member 43 comprises hub-like section 44 having a bore 45 through which pawl shaft 46 extends so that pawl member 43 is pivotally mounted.

Head portion 48 extends outwardly from section 44 and is adapted to contact the teeth 49 of ratchet wheel 40 in the manner previously described with respect to the embodiments shown in FIGS. 1 and 3.

Tail portion 50 includes a first tail-member 51 which extends outwardly from hub-section 44. A second tail-member 52 extends outwardly at an angle to tail-member 51. Tail-member 52 includes surface 53 which is adapted to contact surface 54 of wheel 40.

In operation, as wheel 40 rotates in the direction of arrow 42, head portion 48 moves upwardly as illustrated in phantom 48' thereby tending to pivot pawl 43 in a clock-wise direction about pawl shaft 46. However, as pawl member 43 pivots, it is limited by tail-portion 50 at the location where surface 53 contacts surface 54 of ratchet wheel 40. As head portion 48' is forced upwardly by a tooth 49 on wheel 40, members 51 and 52 will flex in the manner illustrated by phantom lines 51' and 52' in FIG. 4, thereby storing energy in members 51 and 52 which is released when head-portion 48 passes the apex 57 of a tooth 49 on wheel 40, at which time pawl member 43 will be diased toward wheel 40 to preclude movement of the wheel in a clockwise direction.

While the pawl member embodiment of FIG. 4 shows pawl surface 55 contacting surface 56 of wheel 40, pins could be utilized with tail-section 52 as previously described with the embodiment of FIG. 1 to limit the movement of head 48 so that a clearance exists between pawl surface 55 and tooth surface 56 to minimize the area of contact between the pawl and the ratchet wheel.

While various embodiments have been illustrated, it is appreciated that other shapes utilizing the invention disclosed and claimed herein could be employed by one skilled in the art.

What is claimed is:

1. A unitary pawl for use with a ratchet wheel in which said pawl comprises: a hub-like section adapted to pivot upon a shaft spaced from a ratchet wheel; a substantially rigid first portion extending outwardly from said hublike section in a first direction and adapted to be in contact with a ratchet wheel; means for limiting the movement of said pawl whereby said first portion is spaced from said ratchet wheel to reduce the contact area between said pawl and a ratchet wheel when said pawl is in a biased position relative to said ratchet wheel; a flexible second portion extending from said hub-like section in a second direction, said second portion including integral resilient means for storing energy and releasing said energy to bias said pawl against said ratchet wheel.

2. A pawl in accordance with claim 1 wherein said movement limiting means includes at least one pin positioned adjacent said second portion to limit movement of said first portion toward said ratchet wheel.

* * * * *